United States Patent
Kuromusha

(10) Patent No.: US 8,205,636 B2
(45) Date of Patent: Jun. 26, 2012

(54) FLOW RATE CONTROL VALVE

(75) Inventor: Junya Kuromusha, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 1014 days.

(21) Appl. No.: 12/134,839

(22) Filed: Jun. 6, 2008

(65) Prior Publication Data

US 2009/0032117 A1 Feb. 5, 2009

(30) Foreign Application Priority Data

Aug. 3, 2007 (JP) ................................. 2007-202648

(51) Int. Cl.
 *F16K 31/12* (2006.01)
(52) U.S. Cl. .................... 137/497; 137/494; 137/505.28; 137/505; 251/117
(58) Field of Classification Search .................. 137/494, 137/497, 500, 501, 503, 505, 505.28; 251/282, 251/117; 91/446
See application file for complete search history.

(56) References Cited

U.S. PATENT DOCUMENTS

| | | | | |
|---|---|---|---|---|
| 2,441,220 A | * | 5/1948 | Dixon | 137/504 |
| 3,112,764 A | * | 12/1963 | Anderson et al. | 137/504 |
| 4,422,470 A | * | 12/1983 | Jackson et al. | 137/484.2 |
| 5,280,804 A | * | 1/1994 | Takashima et al. | 137/501 |
| 7,013,913 B2 | * | 3/2006 | Kuromusha et al. | 137/501 |
| 7,665,579 B2 | * | 2/2010 | Itose | 187/234 |
| 2008/0035224 A1 | * | 2/2008 | Tyer | 137/625.34 |

FOREIGN PATENT DOCUMENTS

| | | |
|---|---|---|
| JP | 56-082913 A | 7/1981 |
| JP | 2004-183818 A | 7/2004 |
| JP | 2006-127332 A | 5/2006 |
| JP | 2007-107677 A | 4/2007 |

OTHER PUBLICATIONS

Japanese Office Action dated Mar. 21, 2012, issued in corresponding Japanese Patent Application No. 2007-202648.

* cited by examiner

*Primary Examiner* — John Rivell
*Assistant Examiner* — Minh Le
(74) *Attorney, Agent, or Firm* — Sughrue Mion, PLLC

(57) ABSTRACT

In a pressure compensation type flow rate control valve, overshoot of a flow rate when an upstream pressure is abruptly increased is suppressed. A first variable orifice 11 is provided on the side of an inflow opening and a second variable orifice 15 is provided on the side of an outflow opening. As the spool 3 is displaced from its initial position by a pressure of fluid entering when the upstream fluid pressure is increased, the opening of the first variable orifice 11 is gradually reduced, and the opening of the second variable orifice 15 is gradually increased. Since the second variable orifice 15 on the side of the outflow opening is previously reduced, even if the upstream pressure is abruptly increased, fluid more than a predetermined amount does not flow out toward the downstream.

2 Claims, 4 Drawing Sheets

FLOW RATE CONTROL VALVE

BACKGROUND OF THE INVENTION

1. Field of Invention

The present invention relates to a flow rate control valve used for a fluid pressure apparatus in various industrial machines and vehicles.

2. Description of Related Art

As a pressure compensation type flow rate control valve capable of maintaining a flow rate constant even if a fluid pressure is varied, one such as disclosed in Japanese Patent Application Laid-open No. 2004-183818 is known. In this flow rate control valve, a control spool is slidably disposed in a cylindrical body, and a spring which resiliently biases the spool in the axial direction is interposed between the body and the spool. An inflow side thereof is a variable orifice whose opening can be varied, and an outflow side thereof is a fixed orifice whose opening cannot be varied.

If the upstream fluid pressure is increased, high pressure fluid flows in and the pressure in a valve chamber is increased, and the spool is displaced against the resilient biasing force of the spring. As a result, the opening of the variable throttle is reduced, the pressure is compensated, and a flow rate of fluid flowing downstream is maintained constant.

A problem of the conventional flow rate control valve is that when an upstream fluid pressure is abruptly increased, the flow rate is overshot. Since time lag exists until the Displacement of the spool will begin after the increase in the upstream fluid pressure, if the upstream pressure is abruptly increased, the opening adjustment of the variable orifice can not catch up and excessive amount of fluid flows temporarily.

SUMMARY OF THE INVENTION

The present invention has been accomplished in view of the above problem, and it is an object of the invention to suppress the overshoot of a flow rate when the upstream fluid pressure is abruptly increased.

To solve the above problem, a pressure compensation type flow rate control valve comprises a spool which is displaced from its initial position by a pressure of fluid entering when an upstream fluid pressure is increased, a first variable orifice whose opening is gradually reduced as the spool is displaced from the initial position, and a second variable orifice whose opening is previously reduced when the spool is in the initial position and whose opening is gradually increased as the spool is displaced from the initial position. With this structure, if the upstream pressure is abruptly increased and the opening of the first variable orifice can not be adjusted in time, it is possible to reduce the flow rate by the second variable orifice and the problem that the flow rate is overshot can effectively be avoided.

According to the present invention, it is possible to suppress the overshoot of a flow rate when the upstream fluid pressure is abruptly increased.

DETAILED DESCRIPTION OF THE PREFERRED EMBODIMENTS

Figure 1:
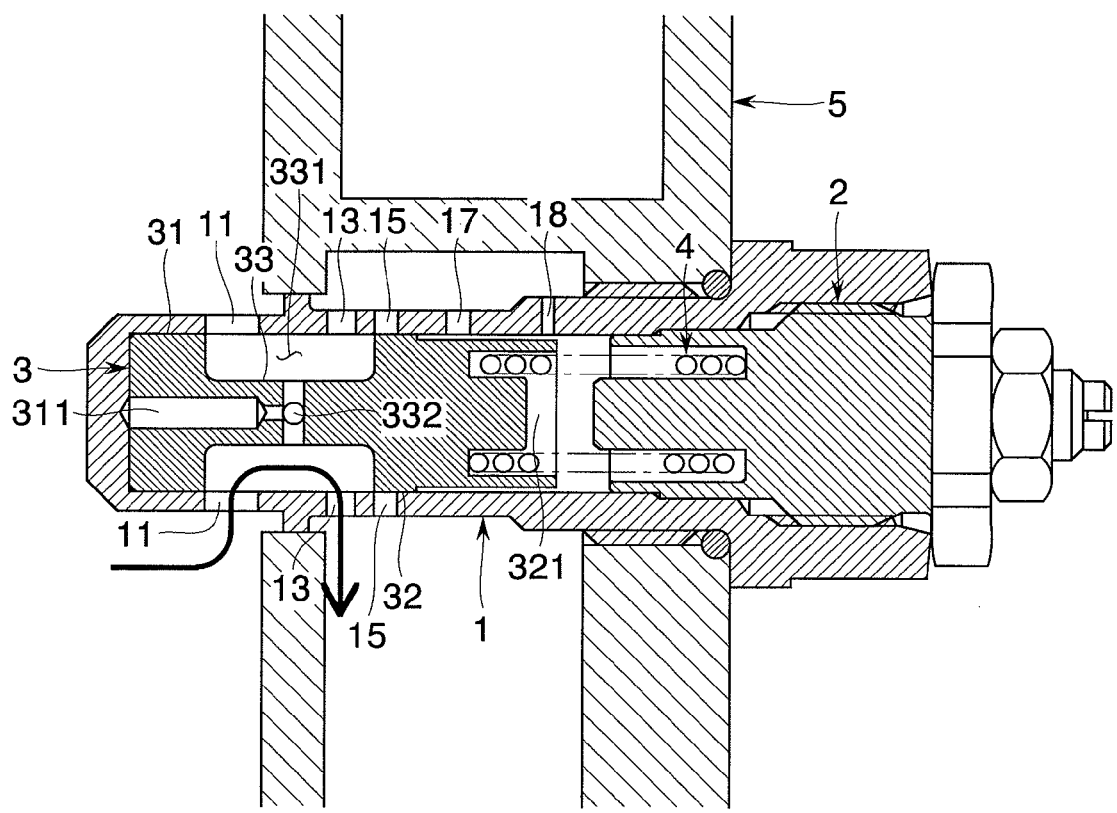
FIG. 1 shows a side sectional view of a flow rate control valve according to an embodiment of the present invention.
Figure 2:
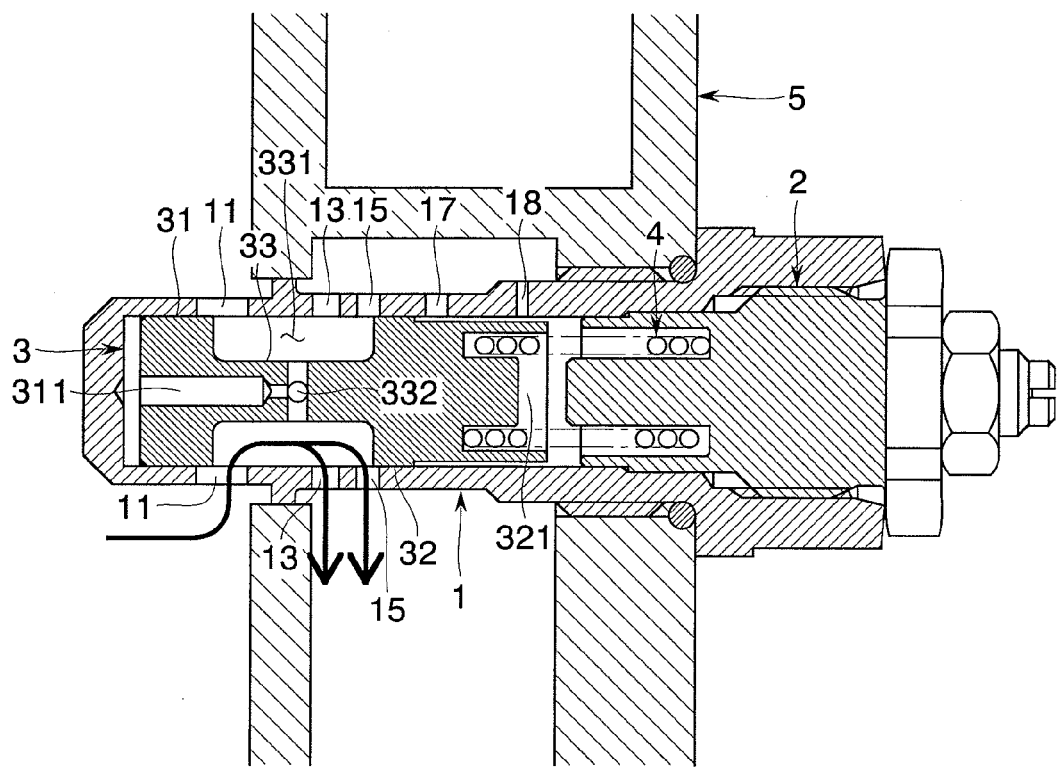
FIG. 2 shows a side sectional view thereof.
Figure 3:
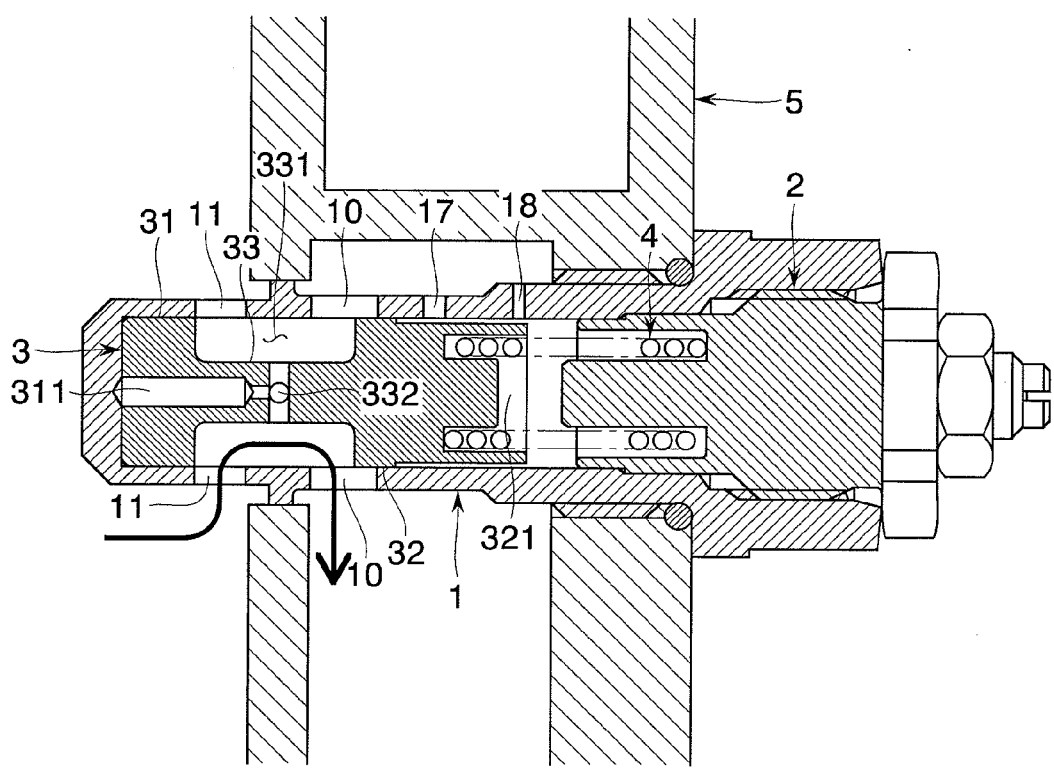
FIG. 3 shows a side sectional view of a modification of the invention.
Figure 4:
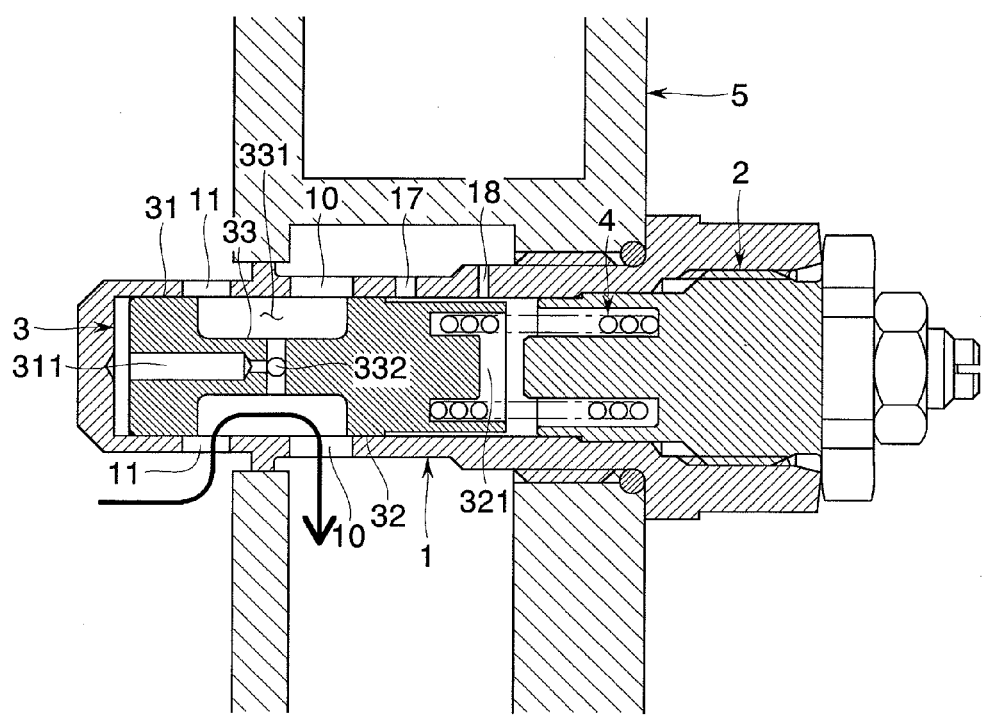
FIG. 4 shows a side sectional view thereof.

An embodiment of the present invention will be explained with reference to the drawings. FIGS. 1 and 2 show a flow rate control valve of the embodiment. The flow rate control valve is incorporated in a casing block 5 of a fluid pressure apparatus, and includes a body 1, a plug 2, a control spool 3 and a spring 4 as essential constituent elements.

The body 1 is of a cylindrical shape whose one end is closed and other end is opened. The spool 3 is held in the body 1 such that the spool 3 can slidably move forward and backward along its axial direction. A plurality of inflow openings 11 and a plurality of outflow openings 13 and 15 are formed in a peripheral wall of the body 1 such that the openings are arranged intermittently substantially on the same circumference. Circulation passages 17 and 18 are also formed in the peripheral wall of the body 1 for introducing downstream fluid pressure into the body 1 (on the other end side in the body 1 where the spring 4 is interposed). The inflow openings 11 exist close to the one end of the body 1, and the outflow openings 13 and 15 are slightly closer to the other end of the body 1 as compared with the inflow openings 11, and the circulation passages 17 and 18 are located closer to the other end than the outflow openings 13 and 15. The plug 2 is threadedly engaged with the other end of the body 1 to close the same.

The spool 3 has a contour wherein an intermediate portion 33 has a smaller diameter by forming an annular recess 331 between its one end 31 and the other end 32. Outer peripheries of the one end 31 and the other end 32 of the spool 3 are substantially in intimate contact with an inner periphery of the body 1. A pressure transmission hole 311 which opens at one end face is formed in the one end 31. The pressure transmission hole 311 is in communication with the annular recess 331 through an internal passage 332 of the intermediate portion 33. A cylindrical hole 321 which opens at the other end face is formed in the other end 32. The spring 4 is inserted into the cylindrical hole 321, one end of the spring 4 is in resilient contact with a bottom of the cylindrical hole 321 and the other end of the spring 4 is in resilient contact with an inner race of the plug 2. The spool 3 is resiliently biased toward the one end by the spring 4.

The one end 31 of the spool 3 opens and closes the inflow opening 11 which is a first variable orifice, and the other end 32 of the spool 3 opens and closes the outflow opening 15 which is a second variable orifice. Fluid entering from the inflow opening 11 reaches the outflow openings 13 and 15 through the annular recess 331 and flows out therefrom.

One end face of the resiliently biased spool 3 hits against the inner face of the body 1 in its initial position shown in FIG. 1. When the spool 3 is in the initial position, the inflow openings 11 are fully opened, and the outflow openings 13 and 15 are partially closed. In the illustrated example, the outflow openings 13 and 15 are formed at a plurality of locations separated away from each other in the axial direction, the outflow opening 13 located close to one end is fully opened, and the outflow opening 15 located close to the other end is fully closed.

If the upstream fluid pressure is increased, a fluid pressure flowing into a valve chamber from the inflow opening 11, i.e., a flowing pressure flowing into the annular recess 331, the pressure transmission hole 311 and a gap between one end face of the spool 3 and the inner face of the body 1 presses the spool 3 toward the other end, and displaces the spool 3 against the resilient biasing force as shown in FIG. 2. As the spool 3 is displaced from the initial position, the opening area of the inflow opening 11 is gradually reduced, but the opening area of the outflow opening 15 is gradually increased. The spool 3 stops at a position where a pressure difference between the pressure in the valve chamber and the downstream pressure matches with a given compensation pressure. With this, the flow rate of fluid flowing from upstream to downstream is maintained constant.

The flow rate control valve of the embodiment includes a first variable orifice 11 on the side of the inflow opening, and a second variable orifice 15 on the side of the outflow opening, and as the spool 3 is displaced from the initial position by the pressure of fluid entering when the upstream fluid pressure is increased, the opening of the first variable orifice 11 is gradually reduced, and the opening of the second variable orifice 15 is gradually increased. Since the opening of the second variable orifice 15 on the side of the outflow opening is previously reduced when the spool 3 is in the initial position, even if the upstream pressure is abruptly increased and the displacement of the spool 3 and thus, the adjustment of the opening of the orifice 11 on the side of the inflow opening is delayed, it is possible to avoid a problem that the fluid more than a predetermined amount flow out toward the downstream.

For example, if the conventional flow rate control valve is used for a hydraulic control circuit of a forklift, the lift of the forklift is lowered at a high speed until the flow rate control valve is operated at the time of the start of the lowering motion of the lift (i.e., the spool is displaced and the variable orifice on the side of the inflow opening is reduced by a necessary amount), and a malfunction of a rupture valve may occur in some cases. Further, since the flow rate control valve is operated, the flow rate of the working oil is abruptly reduced and thus, shock is generated in the lift. If the flow rate control valve of the present invention is used, the lift does not lower at a high speed when the lowering motion of the lift is started, and the malfunction of the rupture valve does not occur or the lift does not receive shock.

If the upstream fluid pressure is increased and the flow velocity of fluid flowing through the annular recess 331 is increased, the displacement amount of the spool 3 is increased and the opening of the first variable orifice 11 is reduced. However, since the opening of the second variable orifice 15 is increased, the flow rate is not reduced unnecessarily.

The present invention is not limited to the above-described embodiment. Although the plurality of outflow openings 13 and 15 separated from each other in the axial direction are formed in the body 1 and a portion thereof is the variable orifice 15 and the remaining one is the fixed orifice 13 in the embodiment, a large outflow opening 10 which is expanded in the axial direction may be formed as a variable orifice and the fixed orifice may be omitted.

Concrete structures of various elements may variously be modified within a range not departing from the subject matter of the invention.

What is claimed is:

1. A flow rate control valve comprising:
    a spool which is displaced from its initial position by a pressure of fluid entering when an upstream fluid pressure is increased;
    a first variable orifice whose opening is gradually reduced as the spool is displaced from the initial position; and
    a second variable orifice whose opening is previously reduced when the spool is in the initial position and whose opening is gradually increased as the spool is displaced from the initial position,
    the second variable orifice including a first outflow opening and a second outflow opening,
    when the spool is in the initial position, the first outflow opening is fully closed and the second outflow opening is open.

2. The flow rate control valve according to claim 1, wherein the second outflow opening is a fixed orifice which is always fully opened irrespective of position of the spool.

\* \* \* \* \*